July 4, 1950  A. ELCE ET AL  2,514,041
MANUFACTURE OF ACETIC ANHYDRIDE
Filed July 10, 1946
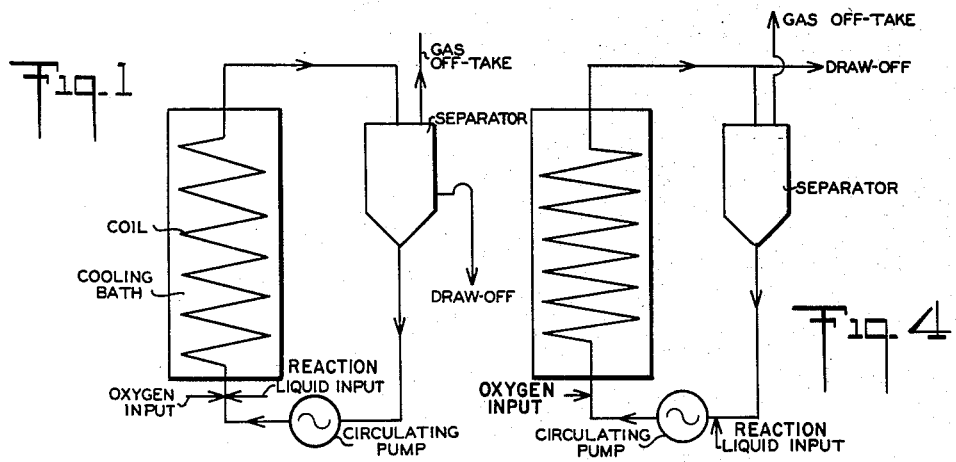
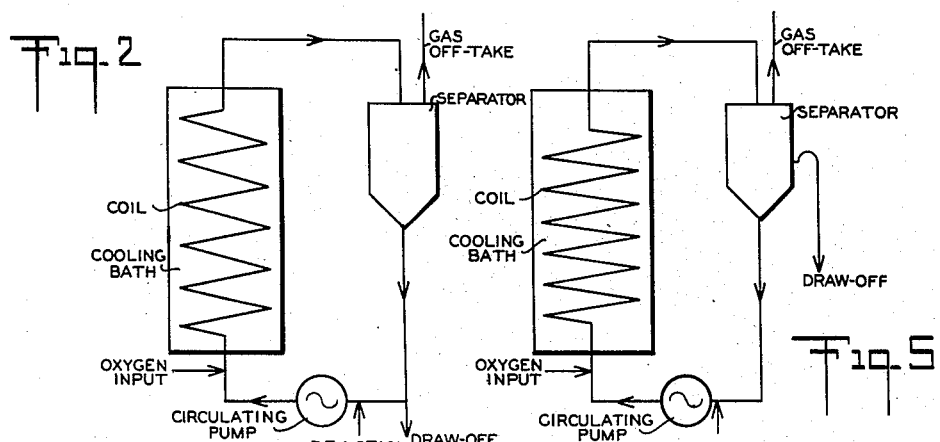
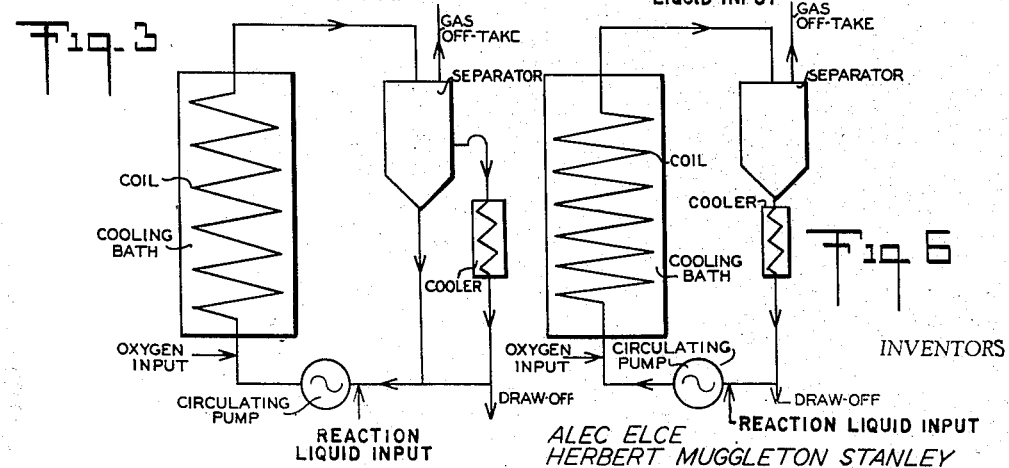
INVENTORS
ALEC ELCE
HERBERT MUGGLETON STANLEY
KARL HEINRICH WALTER TUERCK
Ward Crosby & Neal
their ATTORNEYS Patented July 4, 1950

2,514,041

UNITED STATES PATENT OFFICE 2,514,041

MANUFACTURE OF ACETIC ANHYDRIDE

Alec Elce, Banstead, Herbert Muggleton Stanley, Tadworth, and Karl Heinrich Walter Tuerck, Banstead, England, assignors to The Distillers Company, Limited, Edinburgh, Scotland, a British company Application July 10, 1946, Serial No. 682,456
In Great Britain December 8, 1944

6 Claims. (Cl. 260—546)

This invention is for improvements in or relating to the oxidation of acetaldehyde in the liquid phase, with molecular oxygen to acetic anhydride and this application is a continuation in part of our application Serial No. 633,507 filed December 7th, 1945, now abandoned.

In such oxidation, which was first suggested by Wieland (Berichte der Deutschen Chemischen Gesellschaft, vol. 45, II, 1912, page 2606) it is essential to ensure rapid oxidation in order to prevent the hydrolysis of the formed acetic anhydride.

For this purpose the use of super-atmospheric pressure has been proposed, and the process hitherto has usually been carried out batchwise, utilising a high initial concentration of aldehyde in the reaction mixture. The application of super-atmospheric pressure, however, in such a process leads to the spontaneous occurrence of explosions (see Ullmann, Enzykopadie der Technischen Chemie., vol. 4, p. 650) and therefore in the prior art, e. g. prior British Patent Specification No. 446,259, it was considered important to avoid supplying air at a rate in excess of that at which substantially all the oxygen is absorbed so as to avoid the presence of mixtures of acetaldehyde vapour and oxygen at high pressures. For the same reason, it is suggested in prior British Patent Specification No. 443,151 to introduce only the stoichiometric amount of oxygen as air into the reactor, so that the waste gas consists of substantially pure nitrogen. Thus the benefit of the superatmospheric pressure could not be fully utilised as the oxidation has to be carried out in such a way that substantially no free oxygen escapes from the liquid with the result that a considerable proportion of the liquid is in contact with only a very low oxygen concentration, leading to a slow rate of oxidation. As a result of this, other means such as oxidation in the presence of considerable quantities of diluents, for example ethylacetate, acetic acid, or acetaldehyde, has to be employed in order to obtain reasonably good yields of acetic anhydride. This restriction on the rate of oxidation is especially detrimental to the output of acetic anhydride in the case of continuous operation, i. e. continuous feed of acetaldehyde, and continuous withdrawal of the reaction product from the reaction zone, as in this case the rate of hydrolysis is greatest as a result of the high level of concentration of water and anhydride in the reaction mixture.

It has now been found that in such oxidation reactions the rate of oxidation can be considerably increased, under comparable conditions, to a hitherto unobtainable level, without increase in the production of undesirable further oxidation products.

It is therefore a special object of our invention to manufacture acetic anhydride in a continuous manner by the catalytic oxidation of acetaldehyde in the liquid phase with molecular oxygen, in the absence of a diluent, at super-atmospheric pressure, whereby a reaction product is continuously withdrawn which contains less than 10% of acetaldehyde.

It is another object of the present invention to provide a continuous process in which the rate of oxidation and the concentration of acetic anhydride in the reaction product is considerably increased under comparable conditions, to a hitherto unobtainable level, while the danger of explosion in the gas phase is considerably reduced.

The invention accordingly comprises the novel processes and steps of processes, specific embodiments of which are described hereinafter by way of example and in accordance with which we now prefer to practice the invention.

According to the present invention, there is provided a continuous process for the production of acetic anhydride which comprises continuously circulating a stream of a liquid reaction mixture comprising essentially acetic acid, acetic anhydride, acetaldehyde and an oxidation catalyst through a recirculating reaction system comprising an externally-cooled reaction tube of an internal diameter not exceeding two inches, a separator, wherein the gas phase is separated from the liquid reaction mixture, connected to the outlet end of said tube and a circulating pump connected in a line between the separator and the inlet end of said tube, the volume of the reaction tube exceeding substantially the volume of the liquid contained in the other parts of the recirculating reaction system and which is at substantially the same temperature as that in the reaction tube, the rate of circulation of said stream of liquid reaction mixture being such that, in the absence of gas in the tube, a linear velocity in said tube of at least seven feet per second is attained, introducing molecular oxygen into said liquid reaction mixture in said reaction tube at a rate such that in unit time the volume thereof fed in at the prevailing pressure is less than the volume of liquid feed, withdrawing from the system a portion of the liquid reaction mixture and recovering acetic anhydride therefrom, and recirculating the remainder of the liquid reaction mixture to the reaction tube whilst feeding fresh acetaldehyde thereto. The tube is preferably of circular cross-section although other shapes may, if desired, be employed.

It is one feature of our invention to introduce the oxidising gas into the reactor tube in such an amount that the gas separating in the separator still contains a substantial amount of oxygen, for example, between 2% and 25% by volume and to maintain the separator at atmospheric pressure or at a pressure which exceeds it only by the back-pressure generated by the use of a scrubbing device for the gas.

An important advantage of the process of our invention lies in the fact that, even though the reaction itself is carried out under super-atmospheric pressure, this super-atmospheric pressure no longer prevails in the expanded continuous gas-phase above the liquid in the separator, i. e. where explosions are most liable to occur and consequently the hazard of explosion is greatly diminished or entirely eliminated despite the fact that both oxygen and acetaldehyde vapour may be contained in the gas leaving the reaction zone as a result of a break through of oxygen due to an accidental inefficiency in the catalyst, to an accidental drop in the temperature in the reaction zone or to the use of an excess of oxygen or for any other reason. It is a distinctive advantage of this invention that the conditions of reaction may be deliberately so chosen that a gas mixture is produced in the separator which, under increased pressure, would be liable to explosion. In our process the super-atmospheric pressure developed in the reaction tube is, in the main, due to the flow resistance in the tube caused by the high rate of flow of the liquid. The addition of the gas increases this pressure to a minor extent only. The reaction occurs under conditions in which each gas-bubble is surrounded by an excess of liquid whereby a complete thermal control is maintained.

The preferred temperature range for the oxidation reaction is 40° to 55° C.

In prior British Patent Specification No. 510,959 it has been suggested to carry out the oxidation of acetaldehyde, dissolved in a hydrocarbon, in a series of narrow vertical tubes, using a rapid current of oxidising gas so as to cause the hydrocarbon to froth in the tubes; for this purpose a petrol fraction containing twice its volume of acetaldehyde is passed slowly upwards through the tubes, while air is forced into the lower end and escapes at the upper end through a liquid trap, the pressure throughout being 65 lbs./sq. in. It is obvious that this known process, in which the reaction zone and the continuous gas phase above the liquid are under substantially the same pressure, shares with the other known methods the difficulties which have been overcome by the present invention, namely risk of explosion and the use of large amounts of oxidising gas to give sufficient mixing. On the other hand, it appears surprising that by the present process, where the rate of flow of the liquid in the same direction as that of the gas flow is increased, an increase in the rate of oxidation as well as a high utilisation of the oxygen can be achieved.

How the rate of oxidation is affected by variation in the linear velocity of the circulating reaction liquid, may be seen from the following table, which refers to the oxidation of acetaldehyde, dissolved in acetic acid, with oxygen at 40° C. in the presence of 0.01% by weight cobalt acetate, the acetaldehyde content of the liquid being maintained at 3% by weight and the mean absolute pressure in the tube (⅜" internal diameter, 24' length) being 24 lbs./sq. in., the rate of gas input being the same, namely 200 litres/hr. calculated at normal temperature and pressure.

| Linear velocity of liquid in ft./sec. (calculated from volume of liquid feed). | Oxygen absorbed lbs. normal temperature and pressure/hr. |
|---|---|
| 3.4 | 43 |
| 5.2 | 56 |
| 6.5 | 63 |
| 9.5 | 101 |
| 12 | 135 |

It is evident that below about 7 ft./sec. the rate of absorption does not materially alter, whereas above that figure the increase in output becomes considerable.

As the relative amount of oxidising gas present in the tube at low liquid rates (e. g. 1–5 ft./sec.) is greater than at high liquid rates, it could not be predicted that the use of exceptionally high rates of liquid flow would cause both an increased rate of reaction and a higher conversion of the oxygen in the gas into acetic anhydride. It may be noted that the linear velocities, as used in the present process, are many times higher than those from which a critical Reynolds Number for turbulent flow can be derived.

We have found that the maximum amount of reaction takes place at these high rates of liquid flow if about 30–50% of the tube-volume is occupied by gas, and it is an important feature of our invention to introduce into the reaction zone such an amount of oxidising gas that the gas-space developed under the prevailing conditions of the oxidation is about 30–50% of the total tube volume. The volume occupied by the gas in the tube can be easily determined by measuring the amount of circulating reaction liquid which is substituted by the gas when the gas is flowing.

The internal diameter of the tube used is preferably between ¼" to 2". The diameter is determined by the back-pressure which is desired for the reaction and by the requirements of the surface required for the heat transfer for which the high liquid velocity and the excess of liquid volume over the gas volume are specially favourable. The tube may be straight, or bent; coils immersed in a water bath, or a straight tube with a water-jacket are especially useful. The high velocity of the liquid in the tube establishes a relatively uniform temperature distribution within the tube, and in addition permits the main part of the oxidation reaction to occur at or near the point of entrance of the oxidising gas without overheating taking place, thus avoiding the undue formation of carbon dioxide and other undesired by-products. The tube may contain local restrictions so as to increase the back-pressure but it is preferred to select a uniform diameter of the tube such that it is narrow enough to obtain a uniform pressure drop over the whole length of the reactor up to the point of discharge to the separator. Other means of increasing the flow-resistance such as, for example, bends in the tube may be employed; we prefer to use the tube in the form of a coil immersed in a cooling medium. It is also possible to lead the intimate mixture of gas and liquid downwards through the tube, the liquid rates chosen according to the invention being sufficiently high to counteract any tendency of the oxidising gas to move upwards.

As shown above, it is evident that an increase in linear velocity of the liquid has a greater effect on the rate of oxidation than an increase in pressure.

Generally, we prefer to introduce the gas into the liquid stream near the entrance of the tube, through a pipe in the form of a T-piece, the liquid and the gas lines meeting opposite to each other. Jets or orifices may be used if care is taken that corrosion or choking does not occur. It is, however, one of the advantages of the present invention that special means for effecting dispersion of the oxidising gas in the liquid phase, which always possess a certain degree of danger and lead to an increased power consumption, are not necessary.

The pressure in the separator should preferably not substantially exceed atmospheric pressure, apart from any slight increase in pressure due to the resistance of the scrubbers associated with the separator to wash the effluent gas. We prefer to maintain such a rate of flow that the pressure difference between the entrance to the tube and the separator is at least one atmosphere. Generally speaking, the pressure employed in the atmosphere above the liquid in the separator depends on the inflammability under the prevailing conditions of the vapour-gas mixtures separating in the separator. When using concentrated or pure oxygen, gas mixtures result which are rich in carbon dioxide. We have found that aldehyde-containing gas mixtures containing, besides carbon dioxide, 20–25% by volume of oxygen are non-inflammable at normal pressure. Accordingly, we prefer to pass concentrated oxygen into the tube at such a rate that the effluent gas contains not more than 25% by volume of oxygen. As no pressure-release valves are necessary, and as a high pressure does not prevail in the separator, which might cause the effluent gas-vapour mixture to escape through leaks or glands, it is even possible to exceed this limit of oxygen concentration without serious risk of explosion.

By increasing the rate of flow of the liquid reaction mixture through the reactor the conversion of the oxygen can be surprisingly increased and the reaction can be so regulated that the oxygen fed to the reactor is completely or nearly completely utilised in which case no recirculation of oxygen is necessary and consequently the purification of effluent oxygen for the removal of carbon dioxide or other gaseous reaction products is no longer necessary; consequently it is a special feature of our invention to use such a high rate of liquid flow that more than 70% of the oxygen input is converted.

If the ratio of gas to liquid volumes is low, the oxygen may be introduced on the suction side of a centrifugal pump which serves to force the circulating liquid through the narrow tube at the velocity according to the process of the present invention. This is especially advantageous in cases where a high oxygen concentration has been used in order to effect the oxidation and where any oxygen escaping from the separator, or at least part of it, is to be recycled after carbon dioxide and/or other gaseous products of the oxidation reaction have been removed. If such effluent gases contain even quite small traces of organic vapours together with free oxygen, it is not safe to compress them in the usual type of compressor. This method of introducing the oxidising gas may also be applied, if the aldehyde to be oxidised is to be fed into the system in form of its vapour, with which vapour the oxidising gas is to be saturated.

The oxidation of acetaldehyde under superatmospheric pressure when carried out continuously, in the known way, necessitates feeding the acetaldehyde into the oxidiser under pressure. On the other hand, the highly mobile aldehyde readily permeates through any type of gland of the feed pump, and considerable losses of the volatile aldehyde occurs, apart from the constant danger of inflaming at the glands when operating at even a moderate temperature. A special advantage of the process of our invention is that we avoid these difficulties by enabling the aldehyde to be fed into the oxidation system at low pressure either by gravity or by normal-pressure feed pumps despite the fact that the oxidation reaction is carried out under increased pressure. In the process of our invention, the circulating liquid contains the aldehyde to be oxidised only at a low concentration and the aldehyde is fed in on the suction side of the circulating pump which thus only has to pump a liquid containing a low percentage of acetaldehyde. In this way, losses of acetaldehyde or danger of fire are practically eliminated and a continuous process of oxidation at superatmospheric pressure is possible.

The use of the tubular reactor according to our invention is of special significance for the continuous method of preparing acetic anhydride from acetaldehyde. For this process we prefer to use a tubular reactor whose volume is several times greater than the volume of the other parts of the liquid circulating system in which the liquid is at substantially the same temperature as that in the reaction tube but is not in contact with the oxidising gas, i. e. the separator and pump, including the connecting pipelines. The circulating reaction system may, of course, include a cooler through which a part (or the whole) of the liquid reaction mixture is passed, which cooler is connected between the separator and the circulating pump; where a part only of the liquid reaction mixture is to be cooled, the said cooler is connected in parallel with the pipe line between the separator and the said pump in a by-pass circuit. The liquid reaction mixture withdrawn from the system for the recovery of acetic anhydride therefrom may be withdrawn either directly from the separator or from a point in the line between the separator and the circulating pump and, where a cooler is provided, the withdrawal may advantageously be withdrawn from a point in the line between the cooler and the pump; the withdrawal may, of course, be effected at a point prior to the entry of the liquid into the separator.

We have found that when operating according to our invention, even at acetaldehyde concentrations below 10% by weight in the circulating reaction liquid and at an oxygen conversion above 70% by volume, the rate of oxidation, in relation to the tube volume, is many times higher than can be achieved under the same conditions in the conventional type of reactor, say, a tower or agitator. At the same time, the amount of gas held constantly in intimate contact with the liquid in the tube is considerably greater than that in the known processes, and consequently the contact time for the liquid in the system, necessary for the same output, is correspondingly reduced. The result is that when working continuously under these conditions according to our invention, the yield of acetic anhydride in the reaction product is greater than that hitherto possible in a continuous process. Generally speaking, by employing the process of the present invention, it is possible to obtain higher ratios of acetic anhydride to acetic acid at a given conversion of acetaldehyde under continuous oxidation conditions than has been hitherto possible.

Thus, we are able to produce acetic anhyride in a continuous process with yields of more than 50% by weight of the total acidity (that is, the combined weights of acetic anhydride and acetic acid expressed in terms of the latter) in the reaction product without the help of special diluents or the addition of acetic acid or the use of only low conversions of acetaldehyde but the use of such diluents or the addition of acetic acid in the present process makes it possible to obtain even higher yields, for example, yields above 80%. It is therefore a special object of our invention to manufacture acetic anhydride in a continuous manner by continuously feeding, to the oxidation system, acetaldehyde only and continuously withdrawing from the separator, when the steady state has been reached, a reaction product containing less than 10%, preferably less than 5%, by weight of acetaldehyde, together with acetic acid and acetic anhydride, the molar ratio of acid to anhydride being less than 2 to 1. This is achieved, in the process according to our invention, by increasing the linear velocity of the reaction liquid in the tube to such a value that the hourly production of acetic anhydride, water and acetic acid is at least about double the amount of the reaction liquid in circulation. In this case the temperature of the reaction is kept at about 50° C. and preferably a mixed copper-cobalt acetate catalyst is used.

The following examples illustrate the manner in which the invention may be carried into effect, percentages being stated as being weight by volume unless otherwise indicated and the expression effluent permanent gas meaning the residual gases remaining after acetic acid and acetaldehyde vapours have been washed out from the gas mixture separating in the separator.

*Example 1.*—The reaction liquid is circulated by means of a centrifugal pump through a coil reactor and a separator. The coil reactor, which was made of stainless steel, has a coil of ¾" internal diameter and 60' length thus having a capacity of 5,200 ccs. The separator which is connected to the coil, has a diameter of 4" and is provided with a gas outlet leading to a scrubber and with a pipe through which the liquid product can be continuously withdrawn. Fresh aldehyde is fed into the system between the separator and the pump, whilst oxygen is fed in by means of a compressor at a point near the entrance of the coil reactor and whilst the oxidation product is continuously withdrawn through an overflow. Oxygen was introduced at a rate of 2500 litres per hour, the reaction liquid was circulated at a rate of 38.5 litres/min. It contained 4.4% acetaldehyde, which level was maintained by continuously supplying acetaldehyde to the system. The volume of the liquid in circulation was 6142 ccs., the volume of the coil occupied by the gas was 1678 ccs. i. e. 32% of the coil volume. Accordingly, the volume of the liquid in the coil was more than 3 times that in the pump and separator.

Per hour, 12.15 litres of reaction mixture were continuously withdrawn, containing 42% of acetic anhydride, thus giving acetic anhydride in a yield of 61% of the total acids made.

80% by volume of the oxygen supplied was converted to acetic acid and acetic anhydride; 10% by volume escaped unchanged. The oxygen content of the effluent permanent gas was 22.6% by volume, the remainder being mainly carbon dioxide together with a small proportion of nitrogen.

By reducing the rate of liquid flow from 38.5 litres/min. to 24 litres/min. i. e. from 7.4 ft./sec. to 4.6 ft./sec., the hourly output of total acids dropped from 1855 g./hr. per litre to 1115 g./hr. per litre, while only 60% by volume of the oxygen input was consumed. The yield of acetic anhydride decreased from 61% to 31.5%. The oxygen content of the effluent permanent gas had increased to 60% by volume thereof.

In a further experiment, the rate of liquid flow was further reduced to a value of 2.7 ft./sec. when it was found that, despite an increase in the aldehyde content of the circulating liquid to a value of 6.9%, the total acids produced per hour per litre was substantially the same as the amount produced at a rate of flow of 4.6 ft./sec.

The experiments in this example were carried out utilising a cobalt acetate catalyst in a concentration of 0.15% of the circulating liquid.

*Example 2.*—In the apparatus as used in Example 1, 8.3 litres of reaction liquid were circulated at a rate of 71 litres per min., i. e. 13.5 ft./sec. (calculated on the total cross-section of the coil). In the steady state, per hour, 22 litres of a reaction product were withdrawn, containing per litre 537 g. of acetic anhydride, 361 g. acetic acid and 26 g. acetaldehyde. The acetaldehyde content in the reaction mixture issuing from the reaction tube was maintained at 2.6% by the addition of fresh acetaldehyde.

Per hour, 4400 litres of oxygen (98% pure) (measured at normal temperature and pressure) were introduced, while in the same time about 800 litres of effluent permanent gas containing 19.9% by volume of oxygen and 69.8% by volume of carbon dioxide left the separator. The amount of acetaldehyde converted to carbon dioxide is 1.3% of that fed to the oxidation system.

The yield in acetic anhydride is thus 64%; 96% by volume of the oxygen is utilised.

The temperature of the reaction liquid in the tube was kept at 52° C., the reaction liquid contained 0.01% of copper and 0.02% of cobalt in the form of acetates in solution.

The concentration of percompounds, reckoned as peracetic acid, in the liquid reaction mixture was only 0.6% which is surprising in view of the high rate of oxidation attained since high rates of oxidation have hitherto been generally believed to lead to the formation of high concentration of percompounds.

*Example 3.*—The reaction liquid was forced through the tube of Example 1 at a rate of 12 ft./sec. while per hour only 2670 litres of oxygen (measured at normal temperature and pressure) were passed in. The rate of oxidation was such that per hour continuously 9.7 litres reaction product, containing 42% of acetic anhydride, 51.5% of acetic acid, 1.6% of acetaldehyde, was withdrawn, whereas the volume of the circulating liquid was 8.4 litres. The back-pressure at the entrance to the coil was 40 lbs./sq. in. in excess of the pressure in the separator. Per hour, 560 litres of effluent permanent gas, containing 10% by volume of oxygen and 80.2% by volume of carbon dioxide, left the separator. Thus, 98% by volume of the oxygen was utilised.

The temperature of the liquid in the tube was

52° C., and the catalyst was 0.1% of copper and 0.02% of cobalt (present as the acetates) based on the reaction liquid.

*Example 4.*—Instead of acetaldehyde alone, a mixture of acetic acid and acetaldehyde in the volume ratio of 45:55 was continuously fed into the tube of Example 1. The reaction liquid was circulated through the tube at a rate of 65 litres per min., simultaneously with 4060 litres (measured at normal temperature and pressure) of oxygen (98% pure) so as to give per hour 760 litres (measured at normal temperature and pressure) of effluent permanent gas, containing 22% by volume of oxygen. At a total circulation volume of 8.5 litres, per hour 53.3 litres of reaction liquid, containing 31.1% of acetic anhydride, 2% of acetaldehyde and 0.6% of percompounds was continuously withdrawn. This corresponds to a yield of acetic anhydride of about 80%. The catalyst consisted of 0.2% cobalt and 0.1% copper (present as the acetates). The temperature of the liquid in the tube was maintained at 52° C.

*Example 5.*—In this example as oxidising gas was used a mixture of 85% by volume of oxygen and 15% by volume of nitrogen. Per hour, 3500 litres of this gas (measured at normal temperature and pressure) was forced through the tube of Example 1 together with 3780 litres of reaction liquid, while 608 litres of effluent permanent gas containing 19.6% by volume oxygen, left the reactor, i. e. 96% by volume of the oxygen was utilised.

In the steady state, 15 litres of reaction liquid were withdrawn containing per litre 559 g. acetic anhydride, 353 g. acetic acid, 41 g. acetaldehyde and 4 g. of percompounds. The volume of the liquid in circulation was about 7 litres. 0.8% of the aldehyde was burnt to carbon dioxide.

The temperature of the liquid in the tube was 50° C., the concentration of the catalyst was 0.1% of copper and 0.01% of cobalt (present as the acetates).

*Example 6.*—In this example the oxygen was introduced into the tube of Example 1 via a jet having a one sixteenth inch hole, the oxygen blowing in the direction of the flow of the liquid. Oxygen was put in at such a rate that the effluent permanent gas contained 18.6% by volume of oxygen. The reaction liquid was circulated at a rate of 63 litres a minute, i. e. about 10 ft./sec. Per hour, 22 lbs. of reaction product were withdrawn through the overflow containing 55.5% acetic anhydride and percompounds in an amount of 0.6%. 2.5% of the consumed aldehyde was converted to carbon dioxide. The back-pressure at the bottom end of the reaction tube was 40 lbs./sq. in. superatmospheric.

*Example 7.*—The reaction mixture was circulated at a rate of 140 litres/min. through a tube of 1 inch inside diameter and 90 feet length, which was connected in circuit with a separator for liquid and gas and means for recirculating the liquid. The tube was externally cooled by water so that a temperature of 50° to 55° was maintained in the reaction liquor. Per hour 68 litres of acetaldehyde and about 11,500 litres of oxygen (92% pure) were fed into the circulating liquid. The catalyst concentration was 0.2% copper and 0.05% cobalt both metals being present as acetates. The amount of liquid in circulation was about 20 litres.

The overflow from the separator yielded per hour 35.6 kilograms acetic anhydride and 20.9 kilograms acetic acid.

The effluent permanent gas leaving the separator after being scrubbed with water contained 1.6% by volume of oxygen. Thus about 99.7% of the oxygen was utilised.

The accompanying diagrammatic drawings illustrate in Figs. 1 to 6 inclusive, various forms of apparatus and various modes of operation which may be adopted in carrying the invention into effect but without limitation to the scope of the invention.

What we claim is:

1. A continuous process, which comprises forming a reactant liquid and molecular oxygen mixture of which 70–50% by volume is liquid and 30–50% by volume is oxygen, said liquid containing not over 10% by weight of acetaldehyde, the remainder comprising acetic acid, acetic anhydride and catalyst, passing said mixture at reaction temperature through a tubular reaction zone of sufficient length to produce above 70% consumption of the oxygen, but not substantially longer than is required for the complete consumption of the oxygen, at a linear velocity of at least 7 feet per second (calculated without regard to gas in the tubular reaction zone), discharging the intimate mixture of gas and liquid into a separator, wherein the gas is released therefrom, withdrawing from the system between the separator and the acetaldehyde feed, for the recovery therefrom of acetic anhydride, an amount of the reaction mixture commensurate with the amount of acetaldehyde fed and recirculating the remainder of the reaction mixture to the tubular reaction zone after replenishment with oxygen and acetaldehyde.

2. A process in accordance with claim 1, in which the reactant liquid contains from about 1.6 to 5% by weight of acetaldehyde.

3. A process in accordance with claim 1, in which the molecular oxygen is mixed with not more than about 20% of an inert gas.

4. A process in accordance with claim 1, wherein the inner diameter of the tubular reaction zone is not more than 2 inches whereby the temperature control is facilitated.

5. A process in accordance with claim 1, wherein the linear velocity of the liquid reaction mixture in the tubular reaction zone is such that a hydrodynamic back pressure of at least 35 lbs. per square inch is generated at the inlet end of said tubular reaction zone.

6. A process in accordance with claim 1, wherein the gas released in the separator from the reaction mixture is substantially at atmospheric pressure.

ALEC ELCE.
HERBERT MUGGLETON STANLEY.
KARL HEINRICH WALTER TUERCK.

REFERENCES CITED

The following references are of record in the file of this patent:

UNITED STATES PATENTS

| Number | Name | Date |
|---|---|---|
| 2,293,104 | Bludworth | Aug. 18, 1942 |
| 2,298,354 | Dreyfus | Oct. 13, 1942 |

FOREIGN PATENTS

| Number | Country | Date |
|---|---|---|
| 514,268 | Great Britain | Nov. 3, 1939 |

OTHER REFERENCES

Badger et al.: "Elements of Chemical Engineering," pp. 35–39, 5 pages, second edition, 1936.